United States Patent
Sakai et al.

(10) Patent No.: US 8,605,363 B2
(45) Date of Patent: Dec. 10, 2013

(54) INTERNAL FOCUSING LENS

(75) Inventors: Takahiko Sakai, Saitama (JP);
Masaharu Hosoi, Kanagawa (JP)

(73) Assignees: Sony Corporation, Tokyo (JP); Tamron Co., Ltd., Saitama-shi (JP)

( * ) Notice: Subject to any disclaimer, the term of this patent is extended or adjusted under 35 U.S.C. 154(b) by 84 days.

(21) Appl. No.: 13/341,055

(22) Filed: Dec. 30, 2011

(65) Prior Publication Data

US 2012/0194924 A1 Aug. 2, 2012

(30) Foreign Application Priority Data

Jan. 31, 2011 (JP) ................................. 2011-018196

(51) Int. Cl.
*G02B 15/14* (2006.01)
(52) U.S. Cl.
USPC .......................................... 359/684; 359/690
(58) Field of Classification Search
USPC .......................................... 359/684, 690, 689
See application file for complete search history.

(56) References Cited

U.S. PATENT DOCUMENTS

| | | | | |
|---|---|---|---|---|
| 5,615,049 | A * | 3/1997 | Kaneko et al. | 359/684 |
| 6,381,079 | B1 * | 4/2002 | Ogawa | 359/795 |
| 6,628,462 | B2 * | 9/2003 | Ogawa | 359/743 |
| 2002/0075570 | A1 * | 6/2002 | Yamakawa | 359/684 |
| 2002/0122264 | A1 * | 9/2002 | Ogawa | 359/795 |
| 2009/0219619 | A1 * | 9/2009 | Mitsuki | 359/684 |

FOREIGN PATENT DOCUMENTS

| JP | 20020122264 | 9/2000 |
|---|---|---|
| JP | 3445554 B2 | 6/2003 |
| JP | 2009-237542 A | 10/2009 |

* cited by examiner

*Primary Examiner* — Alicia M Harrington
(74) *Attorney, Agent, or Firm* — Foley & Lardner LLP

(57) ABSTRACT

An internal focusing lens includes sequentially from an object side, a first lens group having a positive refractive power; a second lens group having a negative refractive power; and a third lens group having a positive refractive power. During focusing, the second lens group is moved along the optical axis and, the first lens group and the third lens group are fixed. The internal focusing lens satisfies a conditional expression (1) 0.31<f1/f<0.58, where f1 is the focal length of the first lens group and f is the focal length of the entire optical system, at infinity focus.

4 Claims, 9 Drawing Sheets

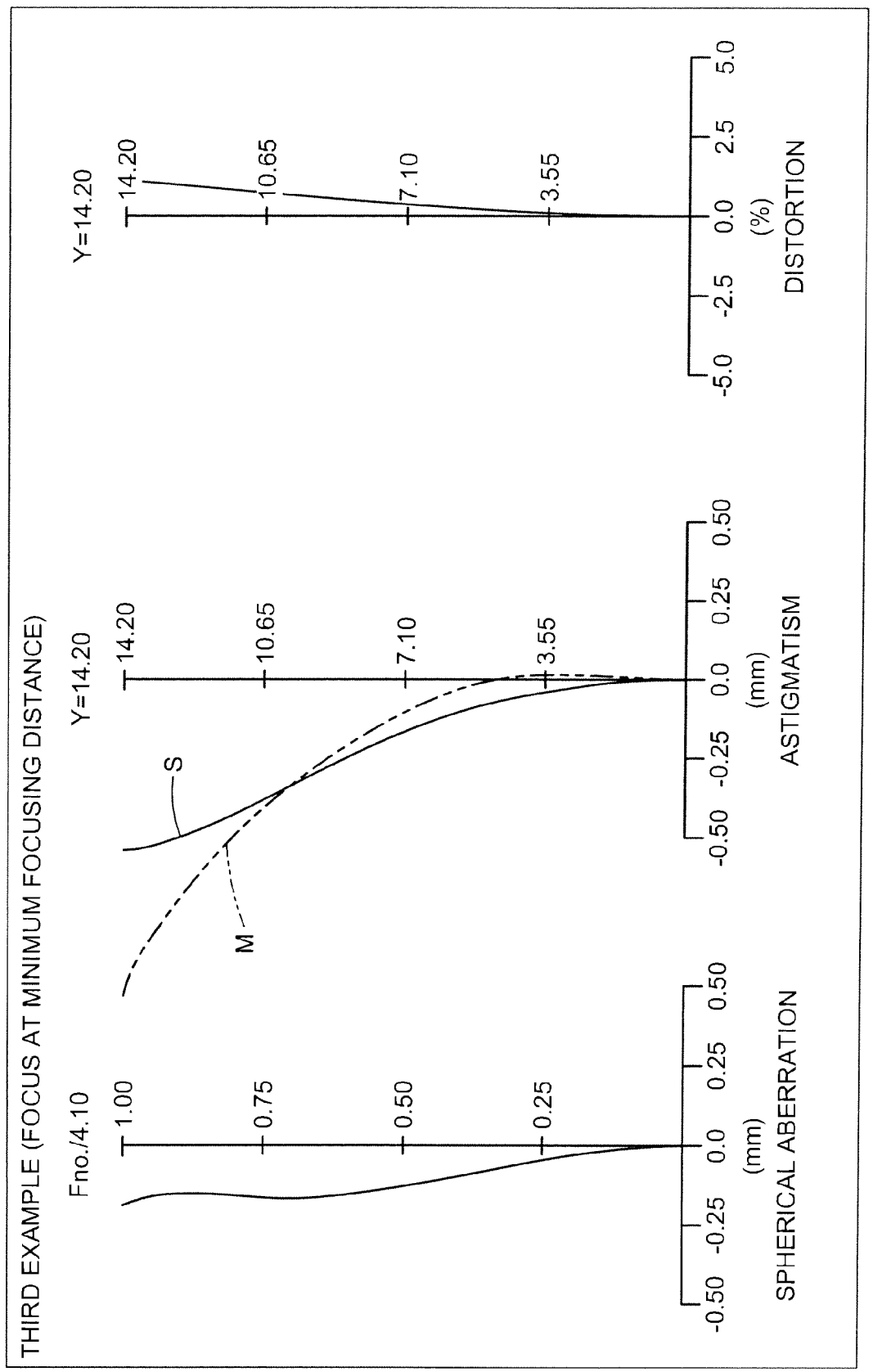

INTERNAL FOCUSING LENS

BACKGROUND OF THE INVENTION

1. Field of the Invention

The present invention relates to a compact, wide angle internal focusing lens suitable for video cameras, electronic still cameras, and the like.

2. Description of the Related Art

In general, imaging lens focusing methods include a front lens scheme in which a first lens group, which is disposed farthest on the object side of the optical system, is moved; an internal focusing scheme in which a second lens group or subsequent lens group disposed farther on the image side of the optical system than the first group, is moved; and a real focusing scheme. Compared to the lenses used for the front lens scheme, the effective optical diameter of the first lens group used in the internal focusing scheme and the real focusing scheme can be made smaller, contributing to the advantage of a smaller dimension of the optical system in terms of diameter. Internal focusing and real focusing lenses perform focusing by moving a lens group of a relatively lighter weight and consequently, when used in an auto-focusing camera, which has become mainstream, offer a further advantage of achieving stable auto-focusing. Thus, many internal focusing and real focusing lenses having such characteristics have been proposed (see, for example, Japanese Patent Application Laid-Open Publication No. 2009-237542, Japanese Patent Nos. 3950571 and 3445554).

The optical system recited in Japanese Patent Application Laid-Open Publication No. 2009-237542 includes a front group and a rear group sandwiching the aperture stop and performs focusing by moving the rear group. However, since the rear group is configured by approximately 3 lenses, the weight of the focusing group is not reduced sufficiently, making high speed focusing difficult to carry out smoothly.

The optical system recited in Japanese Patent No. 3950571 includes a focusing group configured by approximately 1 lens and therefore, compared to the optical system disclosed in Japanese Patent Application Laid-Open Publication No. 2009-237542, facilitates a lighter focusing group. Nonetheless, the optical system recited in Japanese Patent No. 3950571 does not achieve a sufficient wide angle view. In particular, at the converted focal length for a 35 mm camera, the angle of view for an area in the vicinity of 45 mm becomes narrow.

Similar to the optical system recited in Japanese Patent No. 3950571, the angle of view of the optical system recited in U.S. Pat. No. 3,445,554 is difficult to increase. The optical system recited in Japanese Patent No. 3950571 has a further problem in that the size is not sufficiently reduced.

As described, among conventional internal focusing and real focusing lenses, including the cited optical systems, no lens simultaneously achieves a compact optical system, increased wide angle view, and a focusing group of a sufficiently light weight.

SUMMARY OF THE INVENTION

It is an object of the present invention to at least solve the above problems in the conventional technologies.

An internal focusing lens according to one aspect of the invention includes sequentially from an object side, a first lens group having a positive refractive power; a second lens group having a negative refractive power; and a third lens group having a positive refractive power. During focusing, the second lens group is moved along the optical axis and, the first lens group and the third lens group are fixed. The internal focusing lens satisfies a conditional expression (1) $0.31 < f1/f < 0.58$, where f1 is the focal length of the first lens group and f is the focal length of the entire optical system, at infinity focus.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 9 is a diagram of various aberration of the internal focusing lens according to the third example, at focus at the minimum object distance.

DETAILED DESCRIPTION OF THE PREFERRED EMBODIMENTS

Figure 1:
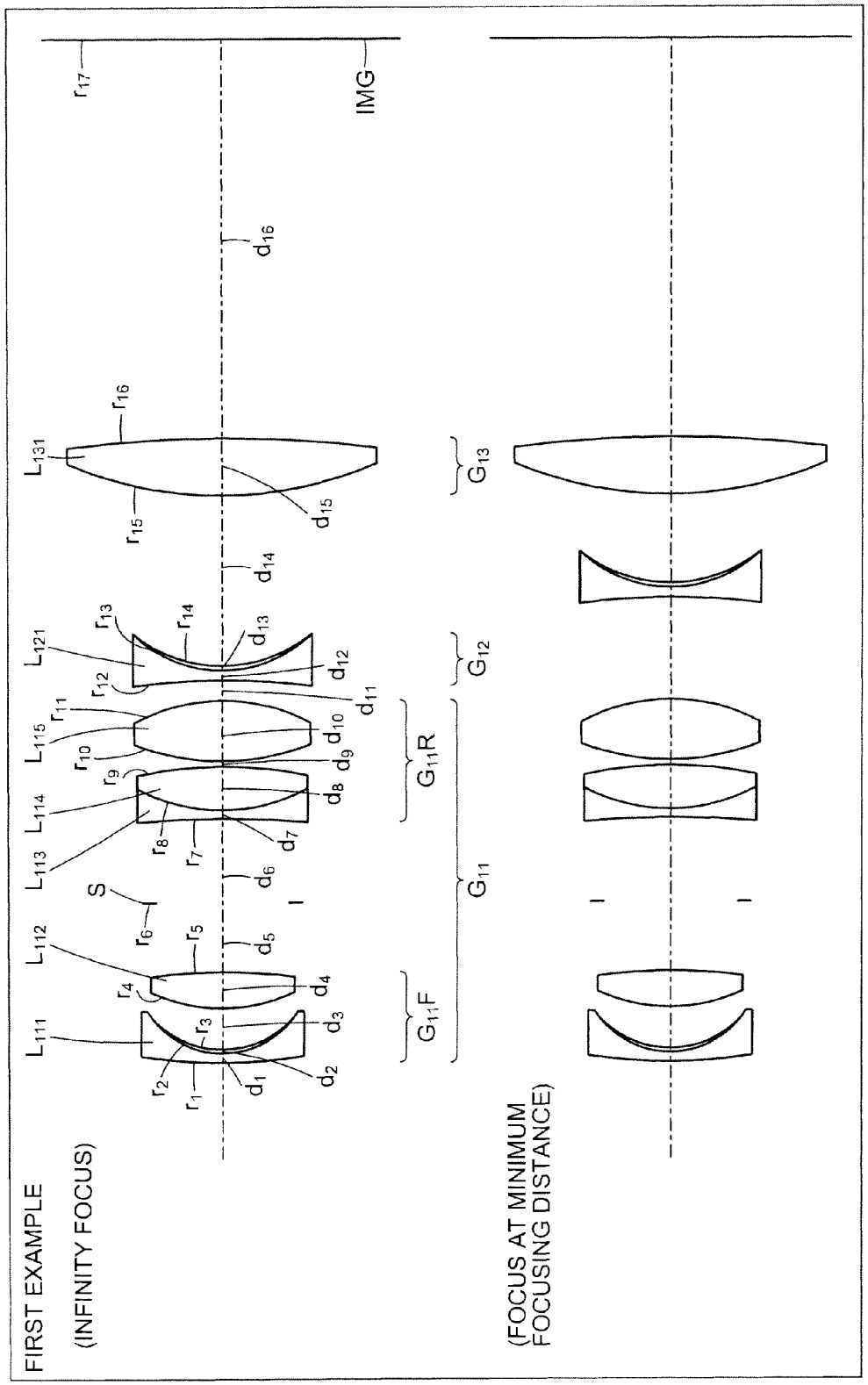
FIG. 1 is a cross sectional view (along the optical axis) of an internal focusing lens according to a first example.

Referring to the accompanying drawings, exemplary embodiments according to the present invention are explained in detail below.

An internal focusing lens according to the present invention includes sequentially from an object side, a first lens group having a positive refractive power, a second lens group having a negative refractive power, and a third lens group having a positive refractive power. During focusing, the internal focusing lens moves the second lens group along the optical axis, while the first lens group and the third lens group are fixed.

One object of the present invention is to provide an internal focusing lens that has a focusing group of a sufficiently light weight, that is compact and has excellent wide angle imaging performance. To achieve this object, in addition to the described characteristics, the following conditions are further set concerning the present invention.

In the internal focusing lens according to the present invention, the second lens group, which is the focusing group, is preferably configured by a single lens. By configuring the focusing group of a single lens to reduce the weight of the focusing group, for example, when the internal focusing lens is used in an auto-focus camera, a stable, high-speed auto-focusing function can be achieved. Further, the load on the focusing mechanism can be reduced as can power consumption and barrel diameter. Herein, a single lens element means a single lens, an aspheric lens, a compound aspheric lens, or a cemented lens.

The internal focusing lens according to the present invention preferably satisfies the following conditional expression, where f1 is the focal length of the first lens group and f is the focal length of the entire optical system, at infinity focus.

$$0.31 < f1/f < 0.58 \quad (1)$$

Conditional expression (1) prescribes a condition to maintain favorable imaging performance of the optical system and to achieve a smaller front lens diameter and a shorter overall optical system length. Below the lower limit of conditional expression (1), the focal length of the first lens group decreases, inviting the problems of spherical aberration being constantly excessive on the under side or the rear lens diameter having to be increased according to the increase in the paraxial imaging magnification of lens groups subsequent to the first lens group, whereby the size of the optical system increases. On the other hand, beyond the upper limit of conditional expression (1), the focal length of the first lens group increases, whereby the overall length of the optical system increases.

If conditional expression (1) is within the following range, more favorable results can be expected.

$$0.35 < f1/f < 0.53 \quad (1)'$$

Within the range prescribed by conditional expression (1)', further reduction of the size of the optical system can be achieved and imaging performance can be improved.

If conditional expression (1)' is within the following range, more favorable results can be expected.

$$0.40 < f1/f < 0.49 \quad (1)''$$

Within the range prescribed by conditional expression (1)", further reduction of the size of the optical system can be achieved and imaging performance can be further improved.

In general, when a relatively wide angle of view is attempted to be achieved, the occurrence of aberration strongly affected by the angle of view, in particular, distortion, becomes significant. Thus, to achieve a wider angle of view, countermeasures for aberration are necessary. In the internal focusing lens according to the present invention, the first lens group includes sequentially from the object side, a first sub-lens group having a negative refractive power and a second sub-lens group having a positive refractive power. The first sub-lens group includes sequentially from the object side, a negative meniscus lens having a convex surface on the object side and a positive lens. The surface on the image side of the negative meniscus lens is an aspheric surface configured such that divergence gradually weakens toward the periphery from a central portion in a vicinity of the optical axis, whereby various types of aberration, particularly, distortion, can be properly corrected.

Additionally, the following conditional expression is satisfied, where asp1nr is the degree of aspheric deformation of the surface on the image side of the negative meniscus lens and f is the focal length of the entire optical system at infinity focus.

$$0.0047 < |asp1nr|/f < 0.0088 \quad (2)$$

Conditional expression (2) prescribes a condition to achieve a wider angle of view and a reduction in the size of the optical system, and to properly correct various types of aberration, particularly, distortion. Below the lower limit of conditional expression (2), distortion is constantly excessive on the under side, while field curvature is excessively on the over side, both of which are difficult to correct. On the other hand, above the upper limit of conditional expression (2), distortion is constantly excessive on the over side or the field curvature is excessive on the under side, both of which are difficult to correct.

If conditional expression (2) is within the following range, more favorable results can be expected.

$$0.0054 < |asp1nr|/f < 0.0081 \quad (2)'$$

Within the range prescribed by conditional expression (2)', further reduction of the size of the optical system can be achieved and imaging performance can be further improved.

If conditional expression (2)' is within the following range, more favorable results can be expected.

$$0.0061 < |asp1nr|/f < 0.0074 \quad (2)''$$

Within the range prescribed by conditional expression (2)", further reduction of the size of the optical system can be achieved and imaging performance can be further improved.

In the internal focusing lens according to the present invention, the image created by the first lens group is magnified by lens groups subsequent to the first lens group, obtaining a desired image height. Consequently, aberration remaining at the first lens group greatly affects the imaging performance of the optical system. Therefore, if aberration is not sufficiently corrected at the first lens group, imaging performance deteriorates. Thus, in the internal focusing lens, an aperture stop is disposed between the first sub-lens group and the second sub-lens group and, the internal focusing lens preferably satisfies the following conditional expression, where LR1S is the distance along the optical axis from the surface farthest on the object side of the first sub-lens group to the aperture stop and LG1 is the distance along the optical axis from the surface farthest on the object side of the first sub-lens group to the surface farthest on the image side of the second sub-lens group.

$$0.31 < LR1S/LG1 < 0.57 \quad (3)$$

Conditional expression (3) prescribes a condition to sufficiently correct aberration at the first lens group and increase imaging performance without sacrificing reductions in the size of the optical system. Below the lower limit of conditional expression (3), the aperture stop is too far on the object side and the light passing through the upper portion is transmitted through peripheral portions of lens groups subsequent to the first lens group and therefore, the diameter of the subsequent lens groups has to be increased or coma, which is greatly affected by the refractive power of the first lens group, becomes excessive. On the other hand, beyond the upper limit of conditional expression (3), the aperture stop is too far on the image side and the light passing through the lower portion is transmitted at a position higher than the optical axis and therefore, the front lens diameter has to be increased or distortion on the under side largely occurs.

If conditional expression (3) is within the following range, more favorable results can be expected.

$$0.35 < LR1S/LG1 < 0.53 \quad (3)'$$

Within the range prescribed by conditional expression (3)', greater reductions in the size of the optical system can be achieved and imaging performance can be further improved.

If conditional expression (3)' is within the following range, more favorable results can be expected.

$$0.40 < LR1S/LG1 < 0.49 \quad (3)''$$

Within the range prescribed by conditional expression (3)", greater reductions in the size of the optical system can be achieved and imaging performance can be further improved.

The internal focusing lens according to the present invention preferably satisfies the following conditional expression, where β2 mod is the imaging magnification of the second lens group at the focus state for the minimum object distance.

$$1.4 < |\beta 2 \, \text{mod}| < 2.5 \quad (4)$$

Conditional expression (4) prescribes a condition to set a suitable distance that the second lens group is moved during focusing, reduce the size of the optical system, and improve imaging performance. Below the lower limit of conditional expression (4), the distance that the second lens group is moved during focusing increases, increasing the length of the optical system and therefore, is undesirable. On the other hand, above the upper limit of conditional expression (4), the distance that the second lens group is moved during focusing becomes too short, making field curvature excessively on the over side, the correction of which is difficult and therefore, undesirable.

If conditional expression (4) is within the following range, more favorable results can be expected.

$$1.6 < |\beta 2 \, \text{mod}| < 2.3 \quad (4)'$$

Within the range prescribed by conditional expression (4)', greater reduction of the size of the optical system can be achieved and imaging performance can be further improved.

If conditional expression (4)' is within the following range, more favorable results can be expected.

$$1.8 < |\beta 2 \, \text{mod}| < 2.1 \quad (4)''$$

Within the range prescribed by conditional expression (4)'', greater reduction of the size of the optical system can be achieved and imaging performance can be further improved.

The internal focusing lens according to the present invention preferably satisfies the following conditional expression, where f2 is the focal length of the second lens group and f is the focal length of the entire optical system at infinity focus.

$$-0.83 < f2/f < -0.44 \quad (5)$$

Conditional expression (5) prescribes a condition to maintain high imaging performance (particularly, favorable correction of field curvature) without sacrificing reductions in the size of the optical system. Below the lower limit of conditional expression (5), the focal length of the second lens group decreases, divergence thereof becomes too strong, and the field curvature becomes excessively on the over side, the correction of which is difficult and therefore, undesirable. On the other hand, above the upper limit of conditional expression (5), the focal length of the second lens group increases, divergence thereof becomes too weak, and the field curvature becomes excessively on the under side, the correction of which is difficult and therefore, undesirable.

If conditional expression (5) is within the following range, more favorable results can be expected.

$$-0.76 < f2/f < -0.51 \quad (5)'$$

Within the range prescribed by conditional expression (5)', further reduction of the size of the optical system can be achieved and the imaging performance can be further improved.

If conditional expression (5)' is within the following range, more favorable results can be expected.

$$-0.70 < f2/f < -0.57 \quad (5)''$$

Within the range prescribed by conditional expression (5)'', further reduction of the size of the optical system can be achieved and the imaging performance can be further improved.

As described, in the internal focusing lens according to the present invention, the second lens group, which is the focusing group, is configured by a single lens, enabling the focusing group to be light weight. A negative meniscus lens having a convex surface on the object side is disposed farthest on the object side of the first lens group. The surface on the image side of the negative meniscus lens is an aspheric surface configured such that divergence gradually weakens toward the periphery from a central portion in a vicinity of the optical axis, whereby prominent aberration, particularly distortion, accompanying wide angle views can be properly corrected. By further satisfying the conditional expressions above, a more compact internal focusing lens having excellent imaging performance can be realized.

With reference to the accompanying drawings, examples of the internal focusing lens according to the present invention will be described in detail. The invention is not limited by the examples below.

FIG. 1 is a cross sectional view (along the optical axis) of the internal focusing lens according to a first example. The internal focusing lens includes sequentially from a side nearest an object (not depicted), a first lens group $G_{11}$ having a positive refractive power, a second lens group $G_{12}$ having a negative refractive power, and a third lens group $G_{13}$ having a positive refractive power. At an imaging plane IMG subsequent to the third lens group $G_{13}$ (right-hand side of drawing), the light receiving surface of an imaging sensor such as a CCD, CMOS, etc. is disposed.

The first lens group $G_{11}$ includes sequentially from the object side, a first sub-lens group $G_{11}F$ having a negative refractive power and a second sub-lens group $G_{11}R$ having a positive refractive power. An aperture stop S, which prescribes a given aperture, is disposed between the first sub-lens group $G_{11}F$ and the second sub-lens group $G_{11}R$. Further, the first sub-lens group $G_{11}F$ includes sequentially from the object side, a negative meniscus lens $L_{111}$ having a convex surface on the object side and a positive lens $L_{112}$. The negative meniscus lens $L_{111}$ is a compound lens whose surface on the imaging plane IMG is aspheric and configured such that, from a central portion in a vicinity of the optical axis, toward the periphery, divergence gradually weakens. The second sub-lens group $G_{11}R$ includes sequentially from the object side, a negative lens $L_{113}$, a positive lens $L_{114}$, and a positive lens $L_{115}$. The negative lens $L_{113}$ and the positive lens $L_{114}$ are cemented. Further, both surfaces of the positive lens $L_{115}$ are aspheric.

The second lens group $G_{12}$ is configured by a negative lens $L_{121}$. The negative lens $L_{121}$ is a compound lens whose surface on the imaging plane IMG side is aspheric.

The third lens group $G_{13}$ is configured by a positive lens $L_{131}$.

The internal focusing lens performs focusing from infinity focus to focus at the minimum object distance by moving the second lens group $G_{12}$ along the optical axis from the object side toward the imaging plane IMG side. The first lens group $G_{11}$ and the third lens group $G_{13}$ are fixed.

Various values related to the internal focusing lens according to the first example are given below.

(Lens data)

$r_1 = 49.294$
$d_1 = 0.70 \; nd_1 = 1.61800 \; vd_1 = 63.4$
$r_2 = 8.281$
$d_2 = 0.20 \; nd_2 = 1.53610 \; vd_2 = 41.2$
$r_3 = 7.498$ (aspheric surface)
$d_3 = 3.00$ -continued $r_4 = 16.940$
$d_4 = 2.68$ $nd_3 = 1.64769$ $vd_3 = 33.8$
$r_5 = -57.578$
$d_5 = 4.90$
$r_6 = \infty$ (aperture stop)
$d_6 = 5.80$
$r_7 = -700.000$
$d_7 = 0.70$ $nd_4 = 1.75520$ $vd_4 = 27.5$
$r_8 = 16.807$
$d_8 = 2.90$ $nd_5 = 1.49700$ $vd_5 = 81.6$
$r_9 = -50.056$
$d_9 = 0.50$
$r_{10} = 21.061$ (aspheric surface)
$d_{10} = 3.87$ $nd_6 = 1.59201$ $vd_6 = 67.0$
$r_{11} = -14.209$ (aspheric surface)
$d_{11} = D(11)$
$r_{12} = -46.085$
$d_{12} = 0.70$ $nd_7 = 1.48749$ $vd_7 = 70.4$
$r_{13} = 13.045$
$d_{13} = 0.20$ $nd_8 = 1.53610$ $vd_8 = 41.2$
$r_{14} = 11.339$ (aspheric surface)
$d_{14} = D(14)$
$r_{15} = 37.899$
$d_{15} = 3.92$ $nd_9 = 1.53172$ $vd_9 = 48.8$
$r_{16} = -81.945$
$d_{16} = fB$
$r_{17} = \infty$ (imaging plane)

(Values related to constant of the cone (k) and aspheric coefficients ($A_4, A_6, A_8, A_{10}$))

(Third plane)

$k = 0$,
$A_4 = -1.8909 \times 10^{-4}, A_6 = -2.4100 \times 10^{-6}$,
$A_8 = -4.4700 \times 10^{-8}, A_{10} = -4.2700 \times 10^{-10}$
(Tenth plane)

$k = 0$,
$A_4 = -5.7937 \times 10^{-5}, A_6 = 1.0969 \times 10^{-6}$,
$A_8 = -2.7388 \times 10^{-8}, A_{10} = 3.8051 \times 10^{-10}$
(Eleventh plane)

$k = 0$,
$A_4 = 5.1068 \times 10^{-5}, A_6 = 1.2754 \times 10^{-6}$,
$A_8 = -3.1751 \times 10^{-8}, A_{10} = 4.2140 \times 10^{-10}$
(Fourteenth plane)

$k = 0$,
$A_4 = -6.9421 \times 10^{-5}, A_6 = -3.4378 \times 10^{-7}$,
$A_8 = -6.9182 \times 10^{-9}, A_{10} = 6.8268 \times 10^{-11}$ (Values for various focus states)

| | Infinity | Minimum object distance |
|---|---|---|
| F no. | 3.60 | 4.23 |
| Focal length of entire system (f) | 29.1 | 20.6 |
| Angle of view (2ω) | 48.9 | |
| Image height (Y) | 14.20 | 14.20 |
| D (11) | 1.51 | 7.57 |
| D (14) | 12.43 | 6.36 |
| fB (Back focus) | 27.30 | 27.30 |

(Values related to conditional expression (1))
f1 (focal length of first lens group $G_{11}$) = 12.7 f1/f = 0.44
(Values related to conditional expression (2))
|asp1nr(degree of aspheric deformation of surface on image side of negative meniscus lens $L_{111}$)| = 0.20 |asp1nr|/f = 0.0067
(Values related to conditional expression (3))
LR1S (distance along optical axis from surface farthest on object side of first sub-lens group $G_{11}F$ to aperture stop S) = 11.48
LG1 (distance along optical axis from surface farthest on object side of first sub-lens group $G_{11}F$ to surface farthest on image side of second sub-lens group $G_{11}R$) = 25.25 LR1S/LG1 = 0.45
(Values related to conditional expression (4))
|β2mod(imaging magnification of second lens group $G_{12}$ at focus state for minimum object distance)| = 2.0
(Values related to conditional expression (5))
f2 (focal length of second lens group $G_{12}$) = −18.3 f2/f = −0.63

Figure 2:
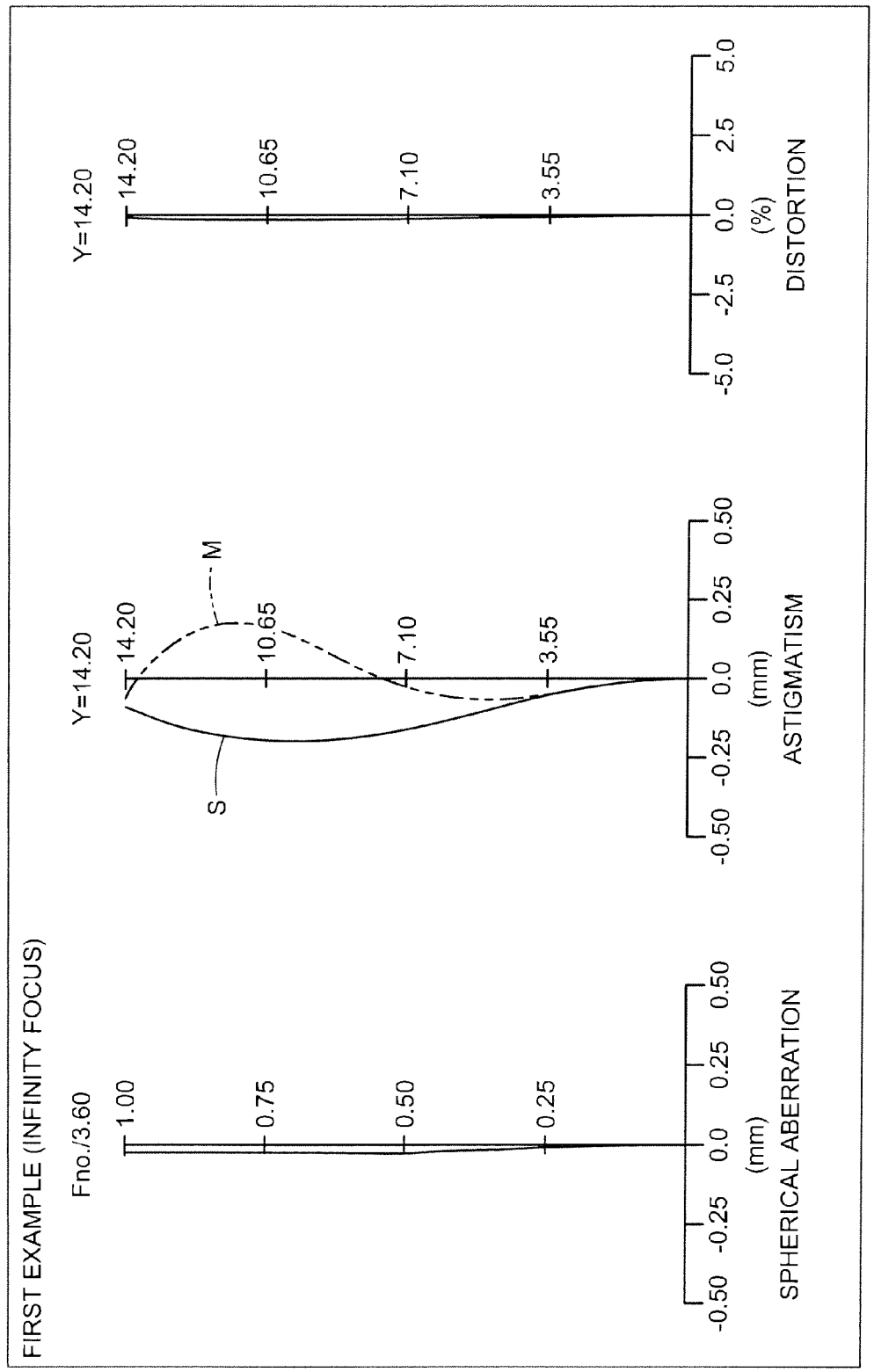
FIG. 2 is a diagram of various types of aberration of the internal focusing lens according to the first example, at infinity focus.
Figure 3:
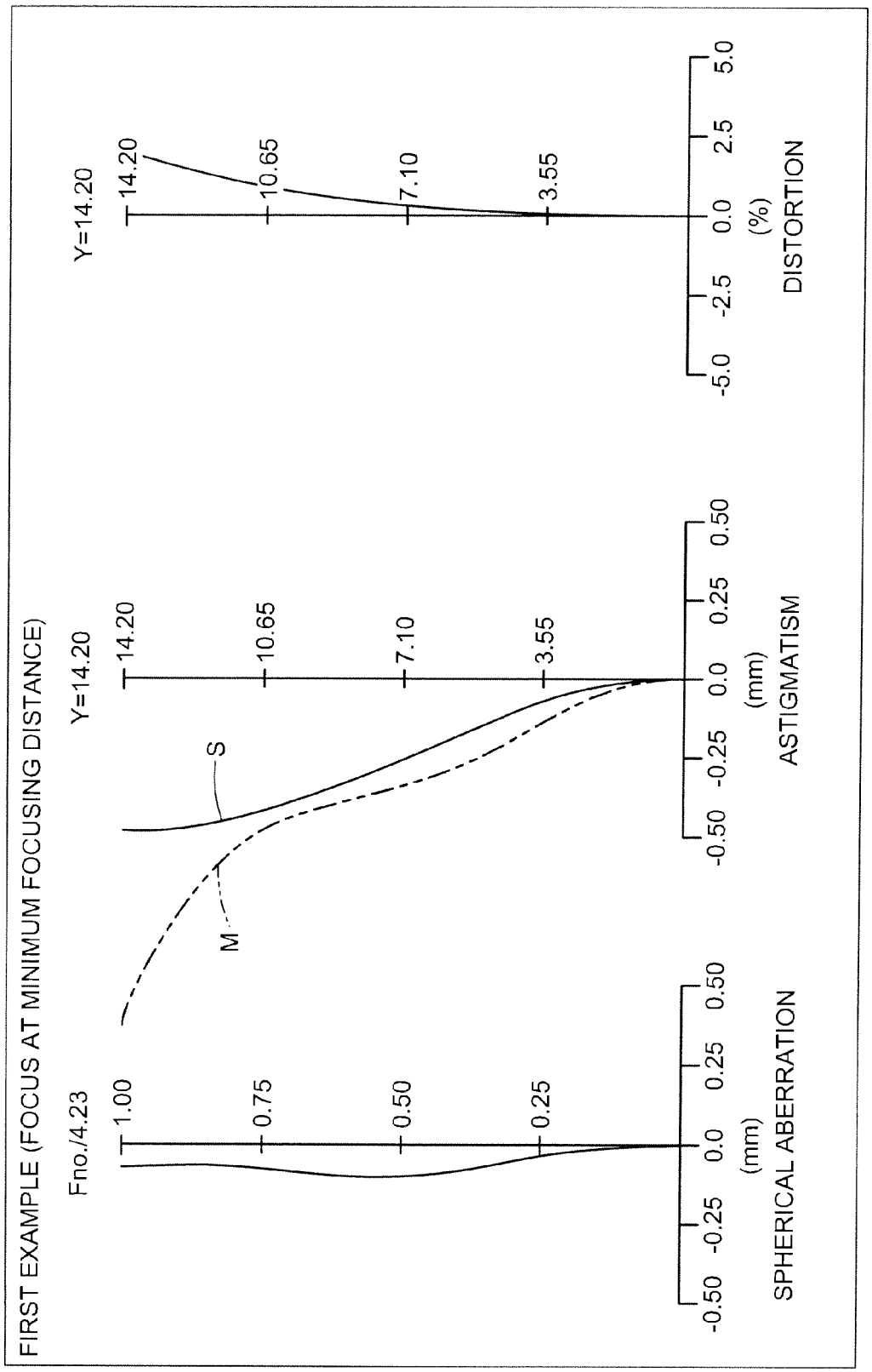
FIG. 3 is a diagram of various types of aberration of the internal focusing lens according to the first example, at focus at the minimum object distance.

FIG. 2 is a diagram of various types of aberration of the internal focusing lens according to the first example, at infinity focus. FIG. 3 is a diagram of various types of aberration of the internal focusing lens according to the first example, at focus at the minimum object distance. The drawings depict wavelength aberration corresponding to the d-line (λ=587.56 nm). Furthermore, in the drawings, S and M shown with respect to astigmatism, respectively indicate aberration at the sagittal image plane and at the meridonal image plane.

Figure 4:
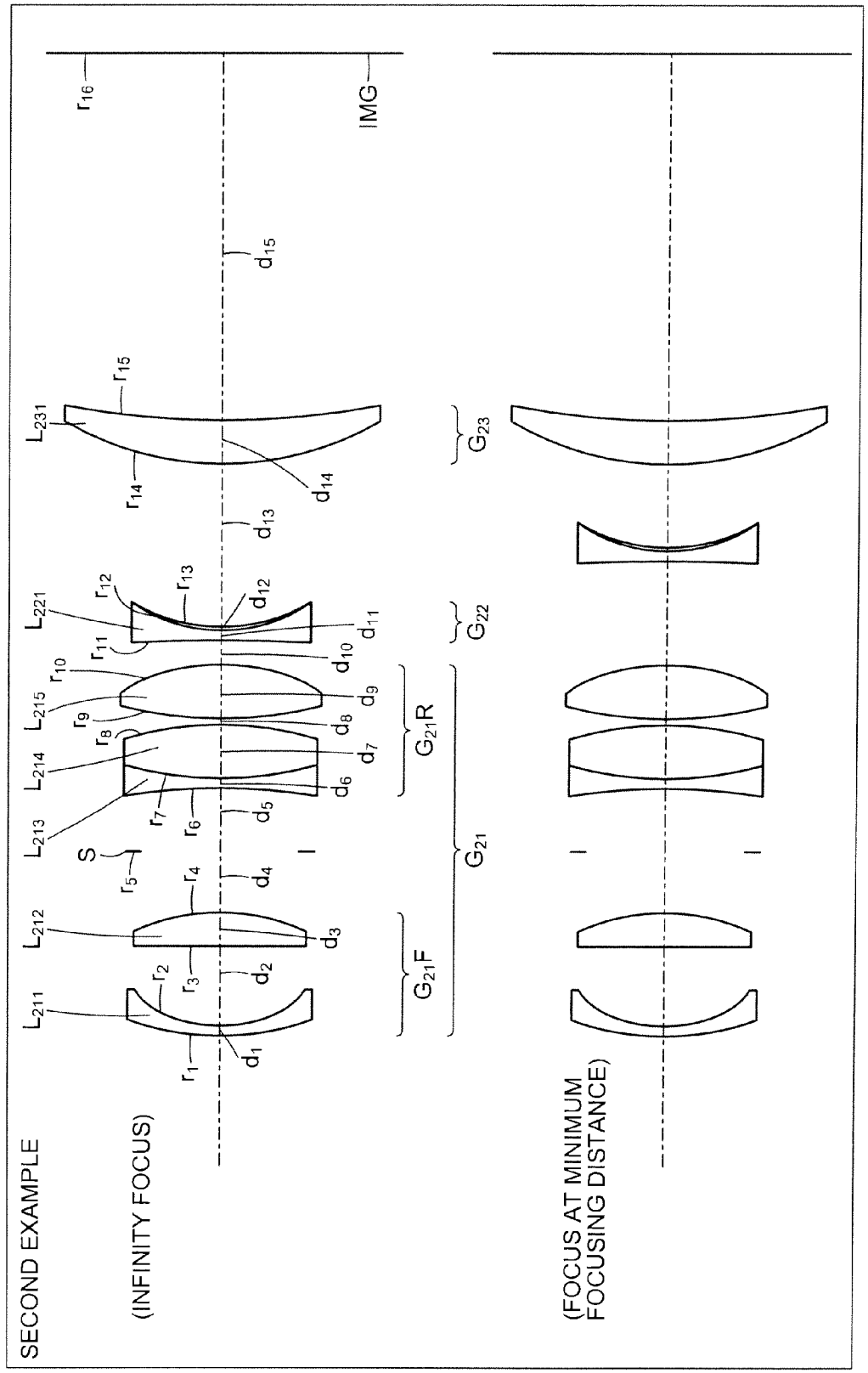
FIG. 4 is a cross sectional view (along the optical axis) of the internal focusing lens according to a second example.

FIG. 4 is a cross sectional view (along the optical axis) of the internal focusing lens according to a second example. The internal focusing lens includes sequentially from the object side, a first lens group $G_{21}$ having a positive refractive power, a second lens group $G_{22}$ having a negative refractive power, and a third lens group $G_{23}$ having a positive refractive power. At the imaging plane IMG subsequent to the third lens group $G_{23}$ (right-hand side of drawing), the light receiving surface of an imaging sensor such as a CCD, CMOS, etc. is disposed.

The first lens group $G_{21}$ includes sequentially from the object side, a first sub-lens group $G_{21}F$ having a negative refractive power and a second sub-lens group $G_{21}R$ having a positive refractive power. The aperture stop S, which prescribes a given aperture, is disposed between the first sub-lens group $G_{21}F$ and the second sub-lens group $G_{21}R$. Further, the first sub-lens group $G_{21}F$ includes sequentially from the object side, a negative meniscus lens $L_{211}$ having a convex surface on the object side and a positive lens $L_{212}$. Both surfaces of the negative meniscus lens $L_{211}$ are aspheric. In particular, the aspheric surface on the imaging plane IMG side of the negative meniscus lens $L_{211}$ is configured such that, from a central portion in a vicinity of the optical axis, toward the periphery, divergence gradually weakens. The second sub-lens group $G_{21}R$ includes sequentially from the object side, a negative lens $L_{213}$, a positive lens $L_{214}$, and a positive lens $L_{215}$. The negative lens $L_{213}$ and the positive lens $L_{214}$ are cemented. Further, both surfaces of the positive lens $L_{215}$ are aspheric.

The second lens group $G_{22}$ is configured by a negative lens $L_{221}$. The negative lens $L_{221}$ is a compound lens whose surface on the imaging plane IMP side is aspheric.

The third lens group $G_{23}$ is configured by a positive lens $L_{231}$.

The internal focusing lens performs focusing from infinity focus to focus at the minimum object distance by moving the second lens group $G_{22}$ along the optical axis from the object side toward the imaging plane IMG side. The first lens group $G_{21}$ and the third lens group $G_{23}$ are fixed.

Various values related to the internal focusing lens according to the second example are given below.

(Lens data)

$r_1 = 22.524$ (aspheric surface)
$d_1 = 0.70$ $nd_1 = 1.59201$ $vd_1 = 67.02$
$r_2 = 7.844$ (aspheric surface)
$d_2 = 5.77$
$r_3 = 1314.307$
$d_3 = 2.30$ $nd_2 = 1.59270$ $vd_2 = 35.45$
$r_4 = -18.604$
$d_4 = 4.60$
$r_5 = \infty$ (aperture stop)
$d_5 = 4.60$
$r_6 = -100.502$
$d_6 = 0.70$ $nd_3 = 1.75520$ $vd_3 = 27.53$
$r_7 = 23.311$
$d_7 = 4.18$ $nd_4 = 1.48749$ $vd_4 = 70.44$
$r_8 = -23.571$ -continued $d_8 = 0.50$
$r_9 = 29.769$ (aspheric surface)
$d_9 = 3.93$ $nd_5 = 1.55332$ $vd_5 = 71.68$
$r_{10} = -14.098$ (aspheric surface)
$d_{10} = D(10)$
$r_{11} = -76.166$
$d_{11} = 0.70$ $nd_6 = 1.48749$ $vd_6 = 70.44$
$r_{12} = 13.111$
$d_{12} = 0.20$ $nd_7 = 1.53610$ $vd_7 = 41.21$
$r_{13} = 11.448$ (aspheric surface)
$d_{13} = D(13)$
$r_{14} = 29.494$
$d_{14} = 3.01$ $nd_8 = 1.48749$ $vd_8 = 70.44$
$r_{15} = 168.008$
$d_{15} = fB$
$r_{16} = \infty$ (imaging plane)

(Values related to constant of the cone (k) and aspheric coefficients ($A_4, A_6, A_8, A_{10}$))

(First plane)

$k = 0$,
$A_4 = -8.9726 \times 10^{-5}, A_6 = 1.2520 \times 10^{-6}$,
$A_8 = -4.2438 \times 10^{-8}, A_{10} = 4.3907 \times 10^{-10}$
(Second plane)

$k = 0$,
$A_4 = -1.4202 \times 10^{-4}, A_6 = -6.7903 \times 10^{-7}$,
$A_8 = -7.3755 \times 10^{-8}, A_{10} = 5.1855 \times 10^{-12}$
(Ninth plane)

$k = 0$,
$A_4 = -2.9541 \times 10^{-5}, A_6 = 1.6453 \times 10^{-7}$,
$A_8 = -3.3458 \times 10^{-9}, A_{10} = 5.5809 \times 10^{-11}$
(Tenth plane)

$k = 0$,
$A_4 = 6.1294 \times 10^{-5}, A_6 = 1.5463 \times 10^{-7}$,
$A_8 = -3.0315 \times 10^{-9}, A_{10} = 5.5815 \times 10^{-11}$
(Thirteenth plane)

$k = 0$,
$A_4 = -4.7521 \times 10^{-5}, A_6 = -5.7981 \times 10^{-7}$,
$A_8 = 4.4984 \times 10^{-9}, A_{10} = -7.0155 \times 10^{-11}$ (Values for various focus states)

|  | Infinity | Minimum object distance |
|---|---|---|
| F no. | 3.58 | 4.13 |
| Focal length of entire system (f) | 29.1 | 19.4 |
| Angle of view (2ω) | 49.7 |  |
| Image height (Y) | 14.20 | 14.20 |
| D (10) | 1.80 | 7.73 |
| D (13) | 13.01 | 7.08 |
| fB (Back focus) | 25.30 | 25.30 |

(Values related to conditional expression (1))
f1 (focal length of first lens group $G_{21}$) = 12.2 f1/f = 0.42
(Values related to conditional expression (2))
|asp1nr(degree of aspheric deformation of surface on image side of negative meniscus lens $L_{211}$)| = 0.19 |asp1nr|/f = 0.0066
(Values related to conditional expression (3))
LR1S (distance along optical axis from surface farthest on object side of first sub-lens group $G_{21}$F to aperture stop S) = 13.37
LG1 (distance along optical axis from surface farthest on object side of first sub-lens group $G_{21}$F to surface farthest on image side of second sub-lens group $G_{21}$R) = 27.28 LR1S/LG1 = 0.49
(Values related to conditional expression (4))
|β2mod(imaging magnification of second lens group $G_{22}$ at focus state for minimum object distance)| = 1.8
(Values related to conditional expression (5))
f2 (focal length of second lens group $G_{22}$) = −20.1 f2/f = −0.69

Figure 5:
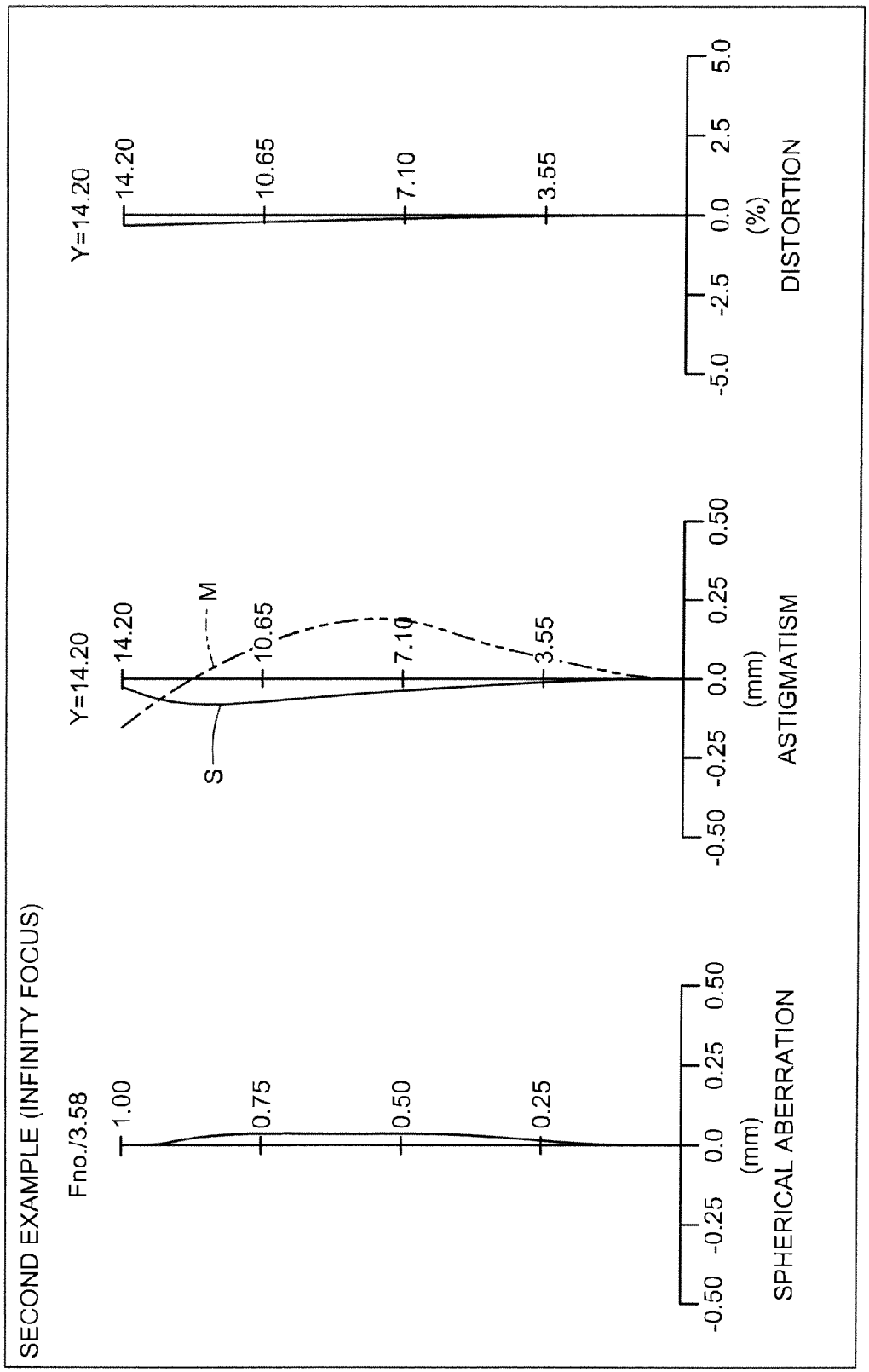
FIG. 5 is a diagram of various types of aberration of the internal focusing lens according to the second example, at infinity focus.
Figure 6:
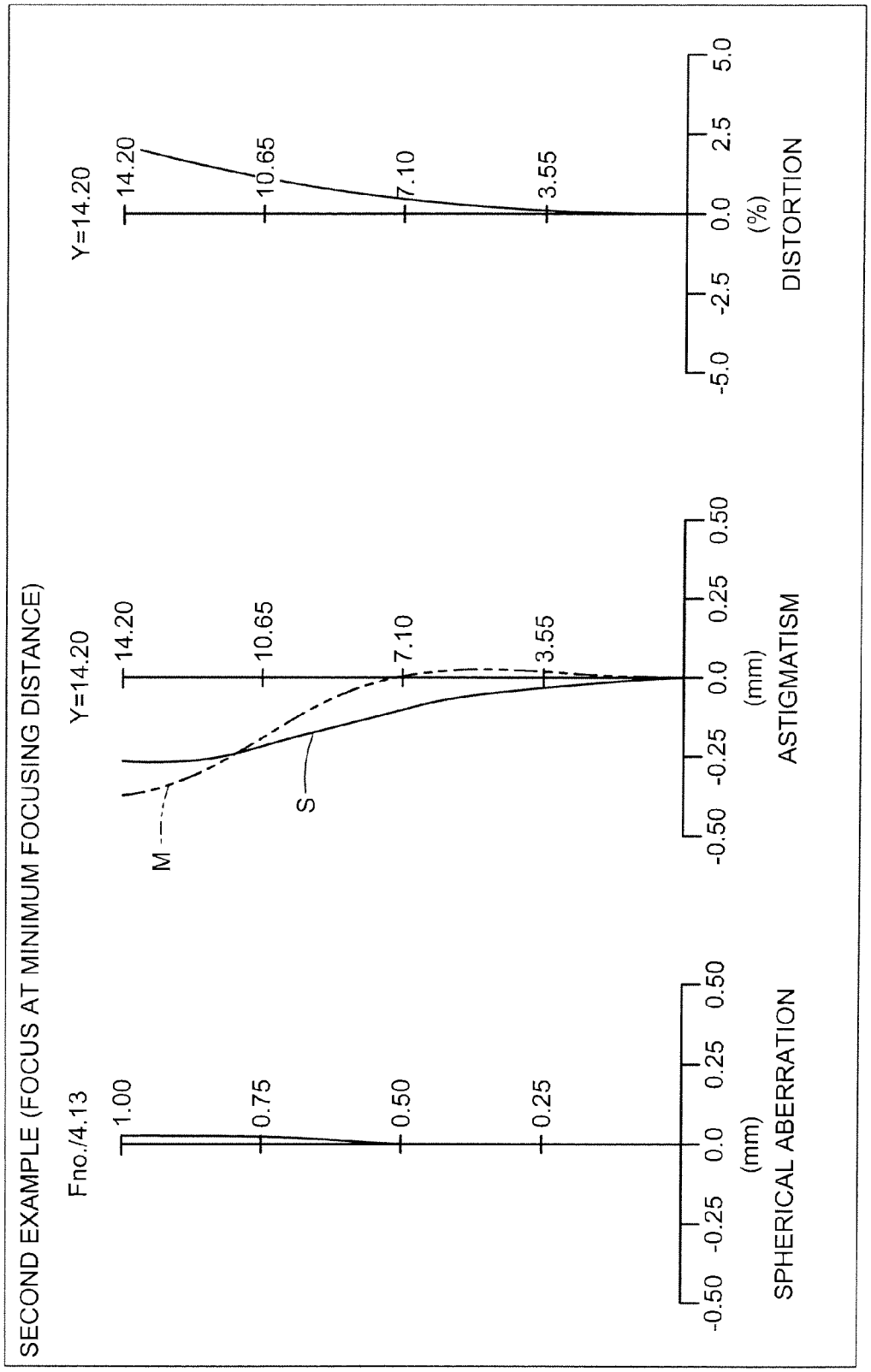
FIG. 6 is a diagram of various types of aberration of the internal focusing lens according to the second example, at focus at the minimum object distance.

FIG. 5 is a diagram of various types of aberration of the internal focusing lens according to the second example, at infinity focus. FIG. 6 is a diagram of various types of aberration of the internal focusing lens according to the second example, at focus at the minimum object distance. The drawing depict wavelength aberration corresponding to the d-line (λ=587.56 nm). Furthermore, in the drawings, S and M shown with respect to astigmatism, respectively indicate aberration at the sagittal image plane and at the meridonal image plane.

Figure 7:
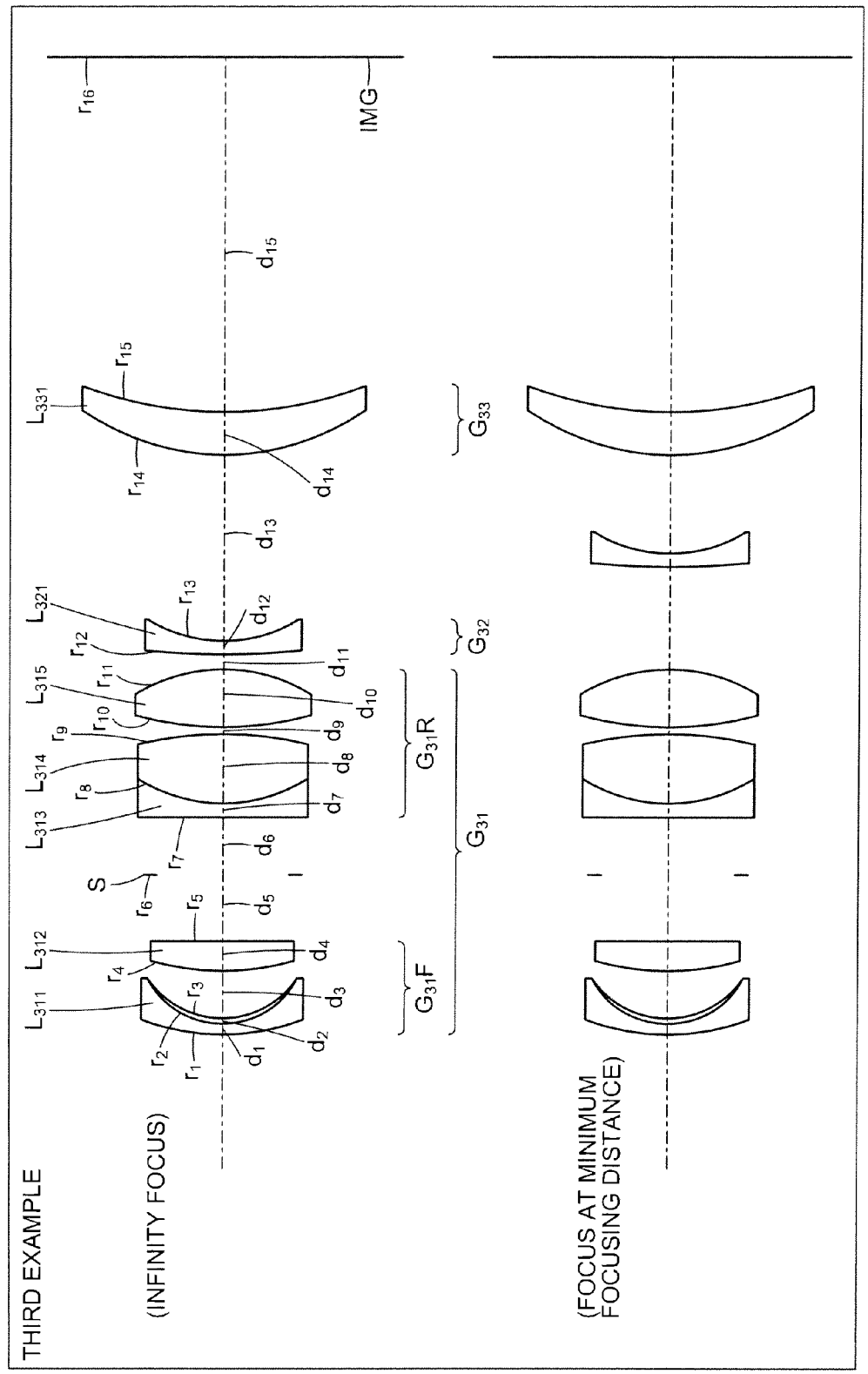
FIG. 7 is a cross sectional view (along the optical axis) of the internal focusing lens according to a third example.

FIG. 7 is a cross sectional view (along the optical axis) of the internal focusing lens according to a third example. The internal focusing lens includes sequentially from the object side, a first lens group $G_{31}$ having a positive refractive power, a second lens group $G_{32}$ having a negative refractive power, and a third lens group $G_{33}$ having a positive refractive power. At the imaging plane IMG subsequent to the third lens group $G_{33}$ (right-hand side of drawing), the light receiving surface of an imaging sensor such as a CCD, CMOS, etc. is disposed.

The first lens group $G_{31}$ includes sequentially from the object side, a first sub-lens group $G_{31}$F having a negative refractive power and a second sub-lens group $G_{31}$R having a positive refractive power. The aperture stop S, which prescribes a given aperture, is disposed between the first sub-lens group $G_{31}$F and the second sub-lens group $G_{31}$R. Further, the first sub-lens group $G_{31}$F includes sequentially from the object side, a negative meniscus lens $L_{311}$ having a convex surface on the object side and a positive lens $L_{312}$. The negative meniscus lens $L_{311}$ is a compound lens whose surface on the imaging plane IMG side is aspheric and configured such that, from a central portion in a vicinity of the optical axis, toward the periphery, divergence gradually weakens. The second sub-lens group $G_{31}$R includes sequentially from the object side, a negative lens $L_{313}$, a positive lens $L_{314}$, and a positive lens $L_{315}$. The negative lens $L_{313}$ and the positive lens $L_{314}$ are cemented. Further, both surfaces of the positive lens $L_{315}$ are aspheric.

The second lens group $G_{32}$ is configured by a negative lens $L_{321}$. The surface on the imaging plane IMG side of the negative lens $L_{321}$ is aspheric.

The third lens group $G_{33}$ is configured by a positive lens $L_{331}$.

The internal focusing lens performs focusing from infinity focus to focus at the minimum object distance by moving the second lens group $G_{32}$ along the optical axis from the object side toward the imaging plane IMG. The first lens group $G_{31}$ and the third lens group $G_{33}$ are fixed.

Various values related to the internal focusing lens according to the third example are given below.

(Lens data)

$r_1 = 28.611$
$d_1 = 0.80$ $nd_1 = 1.51680$ $vd_1 = 64.20$
$r_2 = 7.876$
$d_2 = 0.20$ $nd_2 = 1.53610$ $vd_2 = 41.2$
$r_3 = 7.203$ (aspheric surface)
$d_3 = 2.94$
$r_4 = 22.605$
$d_4 = 1.87$ $nd_3 = 1.84666$ $vd_3 = 23.78$
$r_5 = -250.000$
$d_5 = 4.45$
$r_6 = \infty$ (aperture stop)
$d_6 = 4.36$
$r_7 = -570959.758$
$d_7 = 1.00$ $nd_4 = 1.84666$ $vd_4 = 23.78$
$r_8 = 15.967$
$d_8 = 4.99$ $nd_5 = 1.51680$ $vd_5 = 64.20$
$r_9 = -37.596$
$d_9 = 0.50$
$r_{10} = 22.552$ (aspheric surface)
$d_{10} = 4.03$ $nd_6 = 1.61881$ $vd_6 = 63.86$
$r_{11} = -12.996$ (aspheric surface)
$d_{11} = D(11)$
$r_{12} = 132.018$ -continued $d_{12} = 0.80$ $nd_7 = 1.77250$ $vd_7 = 49.62$
$r_{13} = 12.784$ (aspheric surface)
$d_{13} = D(13)$
$r_{14} = 25.076$
$d_{14} = 3.00$ $nd_8 = 1.84666$ $vd_8 = 23.78$
$r_{15} = 38.589$
$d_{15} = fB$
$r_{16} = \infty$ (imaging plane)

(Values related to constant of the cone (k) and aspheric coefficients ($A_4$, $A_6$, $A_8$, $A_{10}$))

(Third plane)

$k = 0.0506$,
$A_4 = -1.5403 \times 10^{-4}$, $A_6 = -4.7926 \times 10^{-6}$,
$A_8 = 5.2480 \times 10^{-8}$, $A_{10} = -2.7248 \times 10^{-9}$
(Tenth plane)

$k = -0.3705$,
$A_4 = -4.6113 \times 10^{-5}$, $A_6 = -1.6401 \times 10^{-7}$,
$A_8 = 5.6221 \times 10^{-9}$, $A_{10} = -1.2939 \times 10^{-10}$
(Eleventh plane)

$k = 0.8893$,
$A_4 = 1.2728 \times 10^{-4}$, $A_6 = 4.5991 \times 10^{-7}$,
$A_8 = 3.7545 \times 10^{-9}$, $A_{10} = -3.0634 \times 10^{-12}$
(Thirteenth plane)

$k = -0.8959$,
$A_4 = 3.9849 \times 10^{-5}$, $A_6 = -1.7211 \times 10^{-7}$,
$A_8 = 4.1223 \times 10^{-9}$, $A_{10} = -5.2291 \times 10^{-11}$ (Values for various focus states)

|  | Infinity | Minimum object -distance |
|---|---|---|
| F no. | 3.54 | 4.10 |
| Focal length of entire system (f) | 30.0 | 19.0 |
| Angle of view (2ω) | 50.6 |  |
| Image height (Y) | 14.20 | 14.20 |
| D (11) | 1.03 | 6.56 |
| D (13) | 13.03 | 7.50 |
| fB (Back focus) | 23.70 | 23.70 |

(Values related to conditional expression (1))
f1 (focal length of first lens group $G_{31}$) = 12.0 f1/f = 0.40
(Values related to conditional expression (2))
|asp1nr(degree of aspheric deformation of surface on image side of negative meniscus lens $L_{311}$)| = 0.21 |asp1nr|/f = 0.0070
(Values related to conditional expression (3))
LR1S (distance along optical axis from surface farthest on object side of first sub-lens group $G_{31}F$ to aperture stop S) = 10.26
LG1 (distance along optical axis from surface farthest on object side of first sub-lens group $G_{31}F$ to surface farthest on image side of second sub-lens group $G_{31}R$) = 25.13 LR1S/LG1 = 0.41
(Values related to conditional expression (4))
|β2mod(imaging magnification of second lens group $G_{32}$, at focus state for minimum object distance)| = 1.8
(Values related to conditional expression (5))
f2 (focal length of second lens group $G_{32}$) = -18.3 f2/f = -0.61

Figure 8:
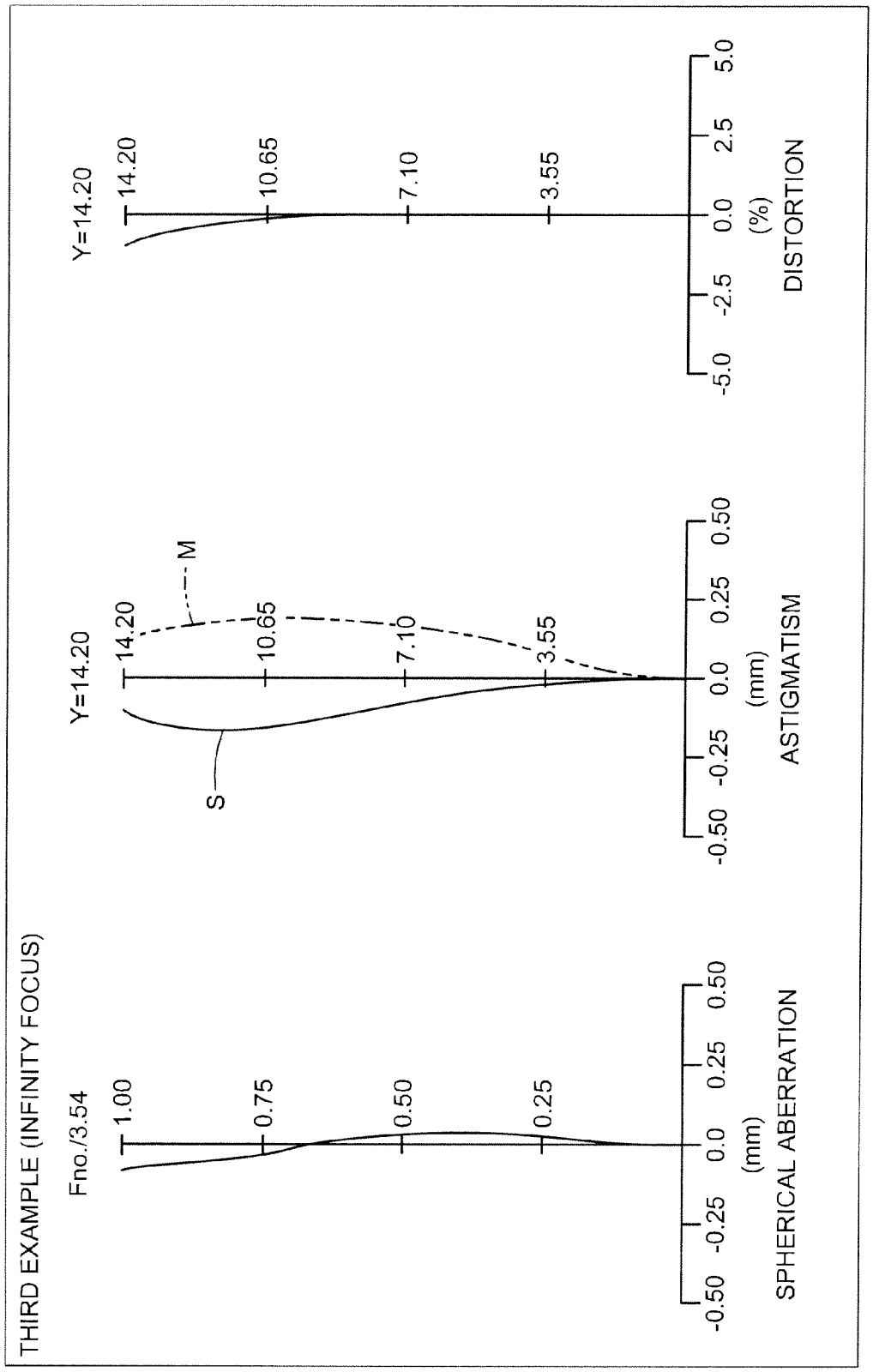
FIG. 8 is a diagram of various types of aberration of the internal focusing lens according to the third example, at infinity focus.

FIG. 8 is a diagram of various types of aberration of the internal focusing lens according to the third example, at infinity focus. FIG. 9 is a diagram of various types of aberration of the internal focusing lens according to the third example, at focus at the minimum object distance. The drawing depict wavelength aberration corresponding to the d-line (λ=587.56 nm). Furthermore, in the drawings, S and M shown with respect to astigmatism, respectively indicate aberration at the sagittal image plane and at the meridonal image plane.

Among the values for each of the examples above, $r_1, r_2, \ldots$ indicate radii of curvature for each lens, diaphragm surface, etc.; $d_1, d_2, \ldots$ indicate the thickness of the lenses, diaphragm, etc. or the distance between surfaces thereof; $nd_1$, $nd_2, \ldots$ indicate the refraction index of each lens with respect to the d-line (λ=587.56 nm), and $vd_1, vd_2, \ldots$ indicate the Abbe number with respect to the d-line (λ=587.56 nm). Lengths are indicated in units of [mm] and angles are indicated in [degrees].

Each aspheric surface shape above is expressed by equation [1], where Z is the depth of the aspheric surface, c is curvature (=1/r: radius of curvature), h is the height from the optical axis, and the travel direction of light is positive.

$$Z = ch^2/[1+\{1-(1+k)c^2h^2\}^{1/2}] + A_4h^4 + A_6h^6 + A_8h^8 + A_{10}h^{10} \quad [1]$$

K is the constant of the cone, $A_4$, $A_6$, $A_8$, and $A_{10}$ are the fourth, sixth, eighth, and tenth aspheric coefficients.

As described, in the internal focusing lens according to each of the examples, the second lens group, which is the focusing group, is configured by a single lens, enabling the focusing group to be light weight. A negative meniscus lens having a convex surface on the object side is disposed farthest on the object side of the first lens group. The surface on the image side of the negative meniscus lens is an aspheric surface configured such that, from a central portion in a vicinity of the optical axis, divergence gradually weakens toward the periphery, whereby prominent aberration, particularly distortion, accompanying wide angle views, can be effectively corrected. By further satisfying the conditional expression above, a more compact internal focusing lens having excellent imaging performance can be realized. The internal focusing lens according to the examples uses lenses and cemented lenses that have a suitable aspheric surface, enabling favorable optical performance to be maintained with fewer lenses. The internal focusing lens according to each of the examples, has a 35 mm camera conversion focal length of 45 mm.

The internal focusing lens is applicable to video cameras and electronic still cameras and is particularly suitable for imaging apparatuses of which compactness and high imaging performance is demanded.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2011-018196 filed in Japan on Jan. 31, 2011.

What is claimed is:

1. An internal focusing lens comprising sequentially from an object side:
   a first lens group having a positive refractive power;
   a second lens group having a negative refractive power; and
   a third lens group having a positive refractive power, wherein
   during focusing, the second lens group is moved along an optical axis and, the first lens group and the third lens group are fixed,
   a conditional expression (1) 0.31<f1/f<0.58 is satisfied, where f1 is a focal length of the first lens group and f is a focal length of the entire optical system, at infinity focus, and
   the first lens group includes sequentially from the object side:
   a first sub-lens group having a negative refractive power, and
   a second sub-lens group having a positive refractive power, the first sub-lens group includes sequentially from the object side:
a negative meniscus lens having a convex surface on the object side, and
a positive lens,
a surface on an image side of the negative meniscus lens is aspheric, and
a conditional expression (2) $0.0047<asp1nr|/f<0.0088$ is satisfied, where asp1nr is a degree of aspheric deformation of the surface on the image side of the negative meniscus lens.

2. The internal focusing lens according to claim 1, further comprising:
an aperture stop between the first sub-lens group and the second sub-lens group, wherein
a conditional expression (3) $0.31<LR1S/LG1<0.57$ is satisfied, where LR1S is a distance along an optical axis from a surface farthest on the object side of the first sub-lens group to the aperture stop and LG1 is a distance from the surface farthest on the object side of the first sub-lens group to a surface farthest on an image side of the second sub-lens group.

3. The internal focusing lens according to claim 1, wherein a conditional expression (4) $1.4<|\beta2\ mod|<2.5$ is satisfied, where $\beta2$ mod is an imaging magnification of the second lens group, at a focus state for a minimum object distance.

4. The internal focusing lens according to claim 1, wherein a conditional expression (5) $-0.83<f2/f<-0.44$ is satisfied, where f2 is a focal distance of the second lens group.

* * * * *